(12) United States Patent
Spencer et al.

(10) Patent No.: US 8,990,364 B2
(45) Date of Patent: Mar. 24, 2015

(54) ARCHITECTURE FOR CONTENT AWARENESS AND CONTROL AMONG PEER-TO-PEER COMMUNICATION DEVICES

(75) Inventors: Brian J. Spencer, San Diego, CA (US); Steven J. Kinneberg, Bellevue, WA (US); Todd Johnsgard, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 273 days.

(21) Appl. No.: 13/588,311

(22) Filed: Aug. 17, 2012

(65) Prior Publication Data

US 2013/0290419 A1   Oct. 31, 2013

Related U.S. Application Data

(63) Continuation-in-part of application No. 13/457,120, filed on Apr. 26, 2012.

(51) Int. Cl.
*G06F 15/16* (2006.01)
*H04L 29/08* (2006.01)
*H04L 29/06* (2006.01)

(52) U.S. Cl.
CPC .......... *H04L 67/104* (2013.01); *H04L 67/1074* (2013.01); *H04L 65/4084* (2013.01)
USPC .......................................... 709/220; 709/229

(58) Field of Classification Search
USPC .......................................... 709/204, 229, 220
See application file for complete search history.

(56) References Cited

U.S. PATENT DOCUMENTS

| | | | | |
|---|---|---|---|---|
| 5,740,384 | A   * | 4/1998 | Asthana et al. | 710/305 |
| 2003/0033420 | A1* | 2/2003 | Eyal et al. | 709/231 |
| 2006/0195479 | A1  | 8/2006 | Spiegelman et al. | |
| 2006/0195521 | A1  | 8/2006 | New et al. | |
| 2007/0147371 | A1* | 6/2007 | Radha et al. | 370/390 |
| 2008/0086525 | A1* | 4/2008 | Angwin | 709/203 |
| 2008/0235588 | A1* | 9/2008 | Gonze et al. | 715/719 |
| 2009/0037005 | A1* | 2/2009 | Larsen et al. | 700/94 |
| 2009/0042508 | A1  | 2/2009 | Wakasa et al. | |
| 2009/0171487 | A1  | 7/2009 | Wilhelm | |
| 2010/0017288 | A1* | 1/2010 | Graham et al. | 705/14.45 |
| 2010/0037752 | A1  | 2/2010 | Hansson et al. | |
| 2010/0082561 | A1  | 4/2010 | Rauber | |
| 2013/0110921 | A1  | 5/2013 | Logan et al. | |
| 2013/0288602 | A1  | 10/2013 | Spencer | |

* cited by examiner

*Primary Examiner* — Ebrahim Golabbakhsh
(74) *Attorney, Agent, or Firm* — Neugeboren O'Dowd PC

(57) ABSTRACT

Apparatus and methods for collaboratively presenting content that is distributed among a plurality of communication devices are disclosed. The method includes providing a control service at a player device to enable communicatively coupled controller devices to control playback of media on the player device, and creating a single play queue at the player device that includes identifiers of media content selected by the controller devices. A stream of particular media content from one of the multiple source devices is received when the particular media content is identified at a top of the single play queue, the particular media content is rendered at the player device, and the rendered media content is presented to users associated with the controller devices.

28 Claims, 22 Drawing Sheets

ARCHITECTURE FOR CONTENT AWARENESS AND CONTROL AMONG PEER-TO-PEER COMMUNICATION DEVICES

CROSS-REFERENCE TO RELATED APPLICATION

The present application is a continuation-in-part of U.S. patent application Ser. No. 13/457,120, filed Apr. 26, 2012, entitled CONTENT AWARENESS AND CONTROL AMONG PEER-TO-PEER COMMUNICATION DEVICES, which is co-pending and commonly owned with the present application.

FIELD OF THE INVENTION

The present invention relates to communication devices. In particular, but not by way of limitation, the present invention relates to communication devices that intercommunicate in peer-to-peer networks.

BACKGROUND OF THE INVENTION

Communication devices such as smartphones, netbooks, gaming devices, tablets, netbooks, PDAs, and laptop computers are now ubiquitous. And the capabilities of these communication devices have developed to a level that enables these communication devices to intercommunicate in a peer-to-peer manner.

For example, peer-to-peer communication is now used in connection with gaming (e.g., multi-player gaming), social networking (e.g., users may exchange messages), groupware applications (e.g., information may be synchronized and shared among ad-hoc groups without an external network), proximity based services (information may be broadcast to communication devices when within close proximity), and media entertainment (e.g., remote control and game control).

In many instances, each of a collection of people in a group social setting (e.g., a road trip, barbecue, party, or other social gathering) have a communication device that includes stored content (e.g., music, images, videos, and other types of files) that may be of interested to other people in the group. Although a particular communication device may be connected to a presentation device (e.g., audio amplifier or audio-visual display) to present content that is stored on that particular communication device it is, at best, inconvenient for content stored on other communication devices in the group to be presented on the presentation device.

For example, in the context of a social setting in which people are listening to music from a single audio device (e.g., a sound system) a first communication device may be streaming music from its memory to the audio device via a local connection (e.g., WiFi or Bluetooth), but the other people in the group cannot stream music from their communication devices to the audio device, if at all, without the first communication device being disconnected so another communication device may be connected to the audio device.

Moreover, each of the people on the group is unaware of the content that the other people in the group have on their devices. For example, people at a social gathering do not know what types of music other people have stored on their communication devices. As a consequence, current peer-to-peer communication techniques are often less than ideal and will almost certainly be unsatisfactory in the future.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

Several aspects of the invention may be characterized as system for playing media content with communication devices that include source devices, player devices, and controller devices. The system includes a plurality of separate source devices each storing media content and providing a media service to enable communication devices that are remote from the player device to identify and retrieve the media content. The system also includes at least one player device that maintains a single play queue of media content that is distributed across the plurality of separate source devices and plays the media content identified in the playing queue. The at least one player device provides a control service to enable communication devices that are remote from the player device to select the media content in the single play queue and to remotely control play of the media content at the player device. The system also includes a plurality of separate controller devices that select, from among available media content that is distributed across the plurality of separate source devices, media content for the single playing queue, and each of the separate controller devices remotely control play, at the player device, of the media content that is stored at the plurality of separate source devices.

Other aspects may be characterized as a method for playing media content that is distributed across multiple source devices. The method includes providing a control service at a player device to enable communicatively coupled controller devices to control playback of media on the player device and creating a single play queue at the player device that includes identifiers of media content selected by the controller devices. The player device also receives a stream of particular media content from one of the multiple source devices when the particular media content is identified at a top of the single play queue, and the player device then renders the particular media content at the player device and presents the rendered media content to users associated with the controller devices.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

Figure 1:
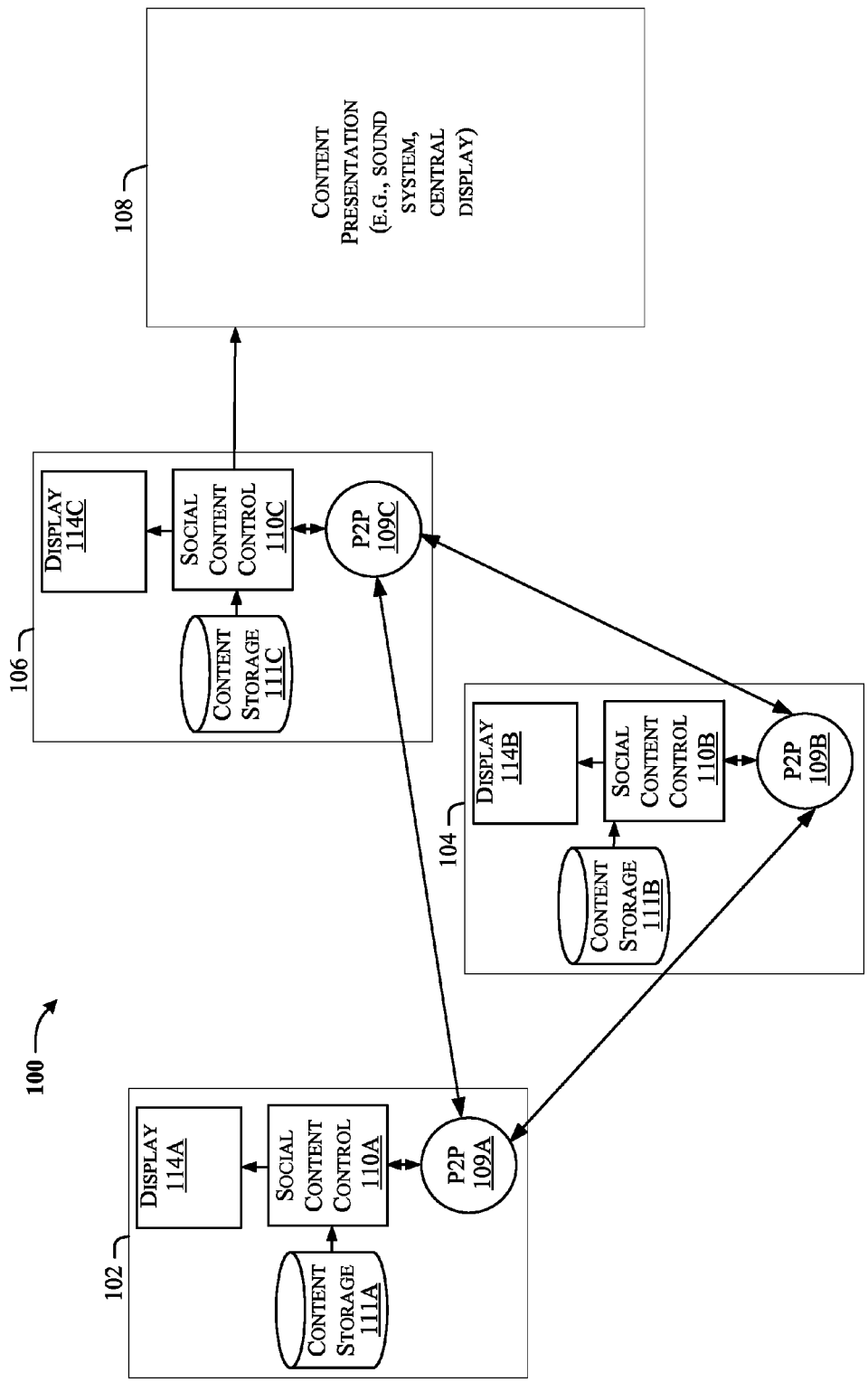
FIG. 1 is a block diagram depicting an environment in which exemplary embodiments of the present invention may be realized.

Referring first to FIG. 1, it is a block diagram depicting an exemplary environment 100 in which several embodiments of the present invention may be realized. As shown, each of a first communication device 102, a second communication device 104, and a third communication device 106 (also referred to as a host device 106) are in communication with other ones of the communication devices 102, 104, 106. And in this environment 100, only one of the communication devices 102, 104, 106—communication device 106—is in communication with a content presentation device 108.

In general, the depicted environment 100 is a social environment in which each person, in a group of people, operates one of the communication devices 102, 104, 106. And embodiments of the present invention enable the group of people to collaboratively select, for presentation at the content presentation device 108, a playlist (also referred to herein as a play queue) of content files that are distributed among all the communication devices 102, 104, 106. The content files may be audio files (e.g., music files), video files, still image files, and/or other types of files. As discussed further herein, the content presentation device 108 is an optional component because content may also be presented via audio and/or display components one of the communication devices 102, 104, 106.

The communication devices 102, 104, 106 may be realized by any of a variety of types of communication devices including smartphones, netbooks, gaming devices, tablets, netbooks, PDAs, and laptop computers. And the content presentation device 108 may be realized by an audio device (e.g. an audio amplifier and audio transducers), a display (e.g., LCD display), or a device that includes both audio and visual display capabilities (e.g., a high-definition television and surround sound system).

In general, any one of the communication devices 102, 104, 106 may implement player functionality (described further herein) to operate as a host (also referred to as a hub) to manage a playlist of content that is distributed among the communication devices 102, 104, 106 and to present the distributed content in the playlist. In addition, each of the communication devices 102, 104, 106 may implement source functionality (described further herein) to operate as a source device that stores and streams content, and enables other ones of the communication devices 102, 104, 106 to view the available content. And any of the communication devices 102, 104, 106 may implement controller functionality (described further herein) to operate as a controller device that has an awareness of content on the communication devices 102, 104, 106 that implement the source functionality; can affect what content is listed in the playlist; and can control the presentation of the content. But for exemplary purposes, only the third communication device 106 in FIG. 1 is depicted as the player to manage the playlist and facilitate the presentation of content. In the configuration depicted in FIG. 1 for example, the host communication device 106 presents the content by passing the content to the content presentation device 108, but the host communication device 106 may also have a display and/or audio system to present the content to the people in the group. As used herein, the term "playlist" generally refers to any type of list that includes references to content. More specifically, the term "playlist" generally refers to lists that may be persistent (e.g., stored in memory after a session has ended) or may be ephemeral in nature (e.g., lists that may persist only as long as all the participants are present in a session).

Although FIG. 1 depicts three communication devices 102, 104, 106 that each include a display 114 (e.g., a touchscreen display), this is certainly not required. For example, some communication devices may be realized by headless communication devices that do not include a display or any direct user interface (e.g., touch pad or touch screen). More specifically, a home file server that does not include a display or user interface (other than by network interface) may function as a source device that provides media content to other communication devices.

Figure 2:
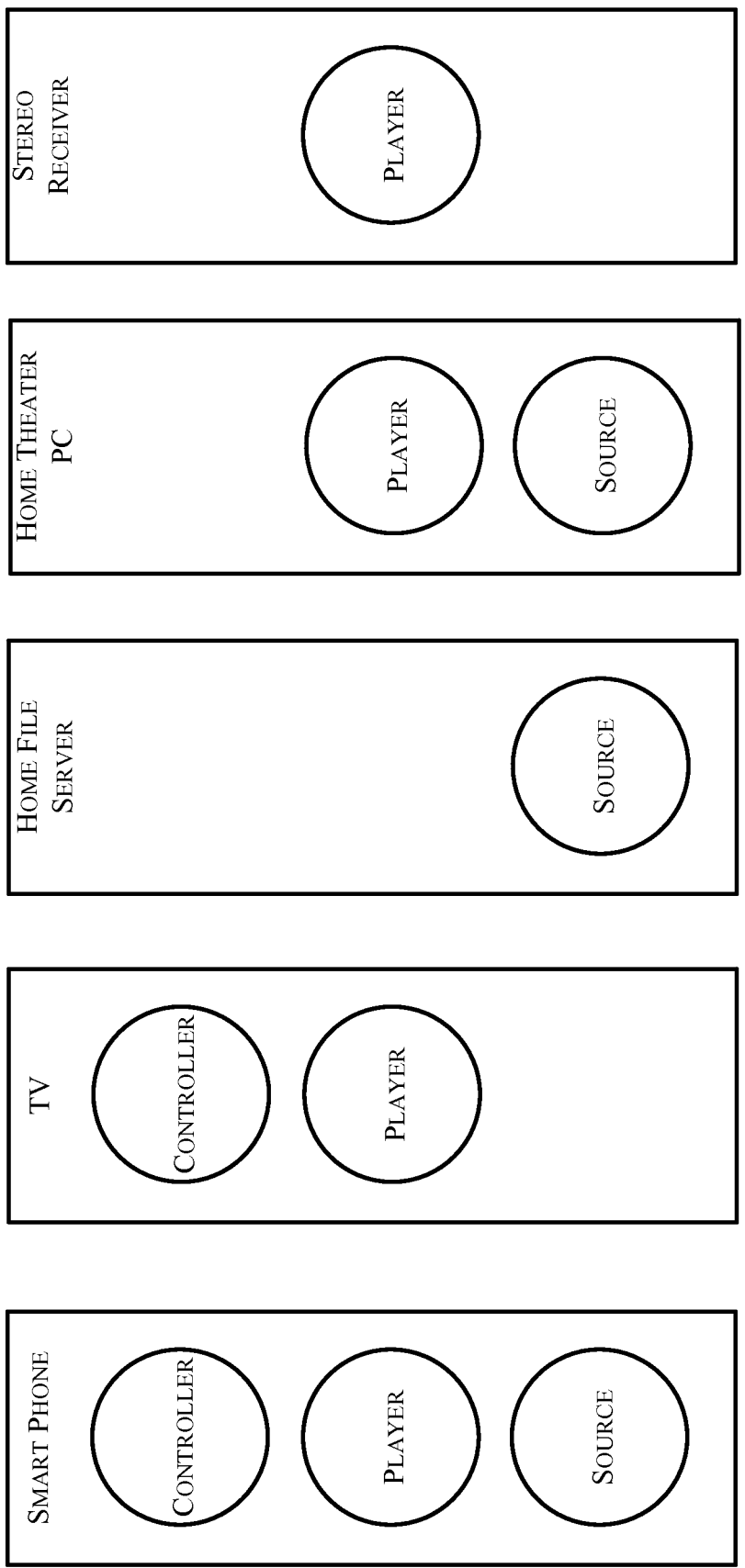
FIG. 2 is a diagram depicting functional roles that may be implemented in communication devices.

Referring to FIG. 2, it is a block diagram depicting an overview of how each of the player, source, and controller roles relate to each other. As shown, exemplary communication devices depicted in FIG. 2 include a smart phone, a television, a home file server, a home theater PC, and a stereo receiver.

As depicted, the smart phone is capable of operating as a controller, player, and a source; the television is capable of operating as a controller and player; the home file server is capable of operating as a source; the home theater PC is capable of operating as a player and a source; and the stereo receiver is capable of operating as a player. It should be recognized that the depicted capabilities are merely examples of the capabilities that some devices may have. Televisions, for example, may also be capable of operating as a source of media, and stereo receivers may be capable of operating as a controller of media playback.

In general, the player role represents components on a device that can play content that resides on one or more devices that implement the source functionality, and the controllers generally operate to control the play of content (e.g., audio, video, or image media) on the player.

Referring again to FIG. 1, the communication device 106 operates as a player to play media from one or more of the communication devices 102, 104, 106 (which may all operate as source devices), and the content presentation device 108 operates as an extension of the communication device 106. More specifically, the content presentation device 108 in this embodiment does not operate as a player to render media, but instead merely displays media and/or functions as an audio transducer (e.g., an amplifier and speaker). And as discussed further herein, one or more of the devices 102, 104, 106 may operate as controllers to control the device 106.

Although other architectures may be utilized in connection with the various embodiments described herein, in the environment 100 depicted in FIG. 1, each of the communication devices 102, 104, 106 includes a peer-to-peer module 109A, 109B, 109C that communicates with one or more of the peer-to-peer modules 109A, 109B, 109C on other ones of the communication devices 102, 104, 106. In addition, each of the communication devices 102, 104, 106 includes a social content control component 110A, 110B, 110C that is in communication with a corresponding content storage component 111A, 111B, 111C and a display 114A, 114B, 114C.

In general, the peer-to-peer modules 109A, 109B, 109C interoperate to effectively extend a bus across the communication devices 102, 104, 106; thus creating a single logical bus, which enables each of the social content control components 110A, 110B, 110C in the communication devices 102, 104, 106 to communicate with any of the other social content control components 110A, 110B, 110C. Although several embodiments are described herein as utilizing a software-bus-type architecture (e.g., an AllJoyn®-type peer-to-peer architecture described further herein), this is certainly not required, and in other embodiments the content awareness and control schemes disclosed herein may be utilized in connection with other message-passing systems using different architectures.

In the embodiment depicted in FIG. 1, each of the social content control applications 110A, 110B, 110C is capable of operating as any combination of one or more of a controller, player, and source. When operating as a controller, the social content control applications 110A, 110B, 110C enable each of the communication devices to 102, 104, 106 to become aware of content that is collectively available among all the communication devices 102, 104, 106 and contribute to the selection of content that is presented at the content presentation device 108 so that, collaboratively, the group of users of the communication devices 102, 104, 106 may select the content that is presented at the content presentation device 108.

As discussed further herein, in many implementations, the communication devices 102, 104, 106 include a platform (e.g., operating system) to facilitate execution of processor-executable instructions that effectuate the social content control components 110A, 110B, 110C and the peer-to-peer components 109A, 109B, 109C. For example, but not by way of limitation, the communication devices 102, 104, 106 may include one of an Android, Ubuntu, Windows, Brew MP, WebOS, Linux, iOS, OpenWRT, or Meego platform.

The physical transport between the communication devices 102, 104, 106 may be any of a variety of technologies and protocols. For example, the communication devices 102, 104, 106, 108 may communicate by Bluetooth, WiFi, or any other transport.

Figure 3:
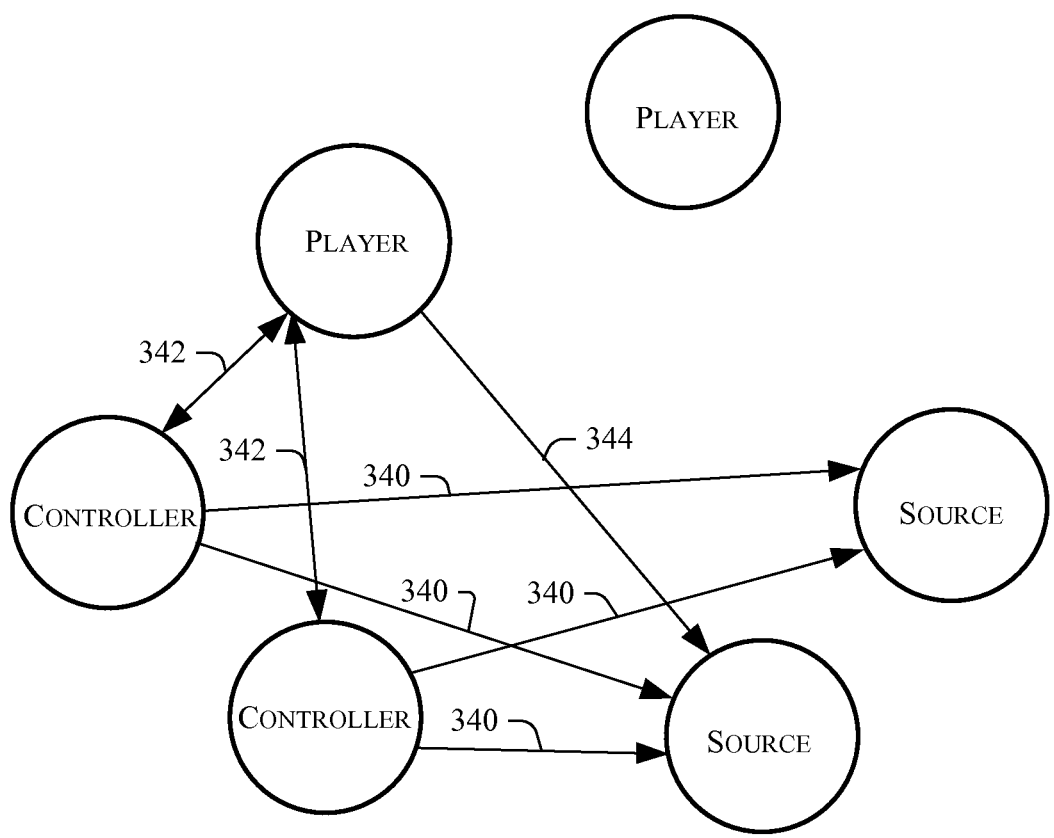
FIG. 3 is a diagram depicting exemplary interaction between controllers, players, and sources.

Referring to FIG. 3 it is a diagram depicting two controllers, two players and two sources that, for purposes of clarity, are abstracted from particular types of communication devices. The depiction of two devices implementing each role is used only for showing a simple example. The actual number of controllers, players, and sources can be any number, as long as a minimum of one of each of the three roles is present in order for media to start playing. And in many embodiments, the controller only needs to be involved in creating the play queue on the player, and then the controller can leave any time after that—the player will continue to stream from the sources according to the media identified in the play queue.

It should also be recognized that a single device may function as any combination of one or more of a controller, player, and source. For example a device may function as only one of a player, controller, or source. In addition, a device may function as a source and player; a source and controller; a controller and player; or a player, source, and controller.

As shown in this diagram, each of the controllers is involved in an ephemeral session 340 with the sources to obtain metadata that indicates the media content that is available on the sources. In addition, each of the controllers is involved in a session 342 with a player to control operations on the player and to get updated playback information from the player. And the player is engaged in an ephemeral media session 344 with a source to obtain streaming media from the source. As seen in this diagram, only one of the players is involved in a session. This is because typical usage for many implementations will include different people in a given area selecting from a shared set of media distributed among sources that is played through one player. FIG. 3 also shows the availability of two players to choose from but everyone chose just the one player to use.

Controllers Choosing a Player

Figure 4:
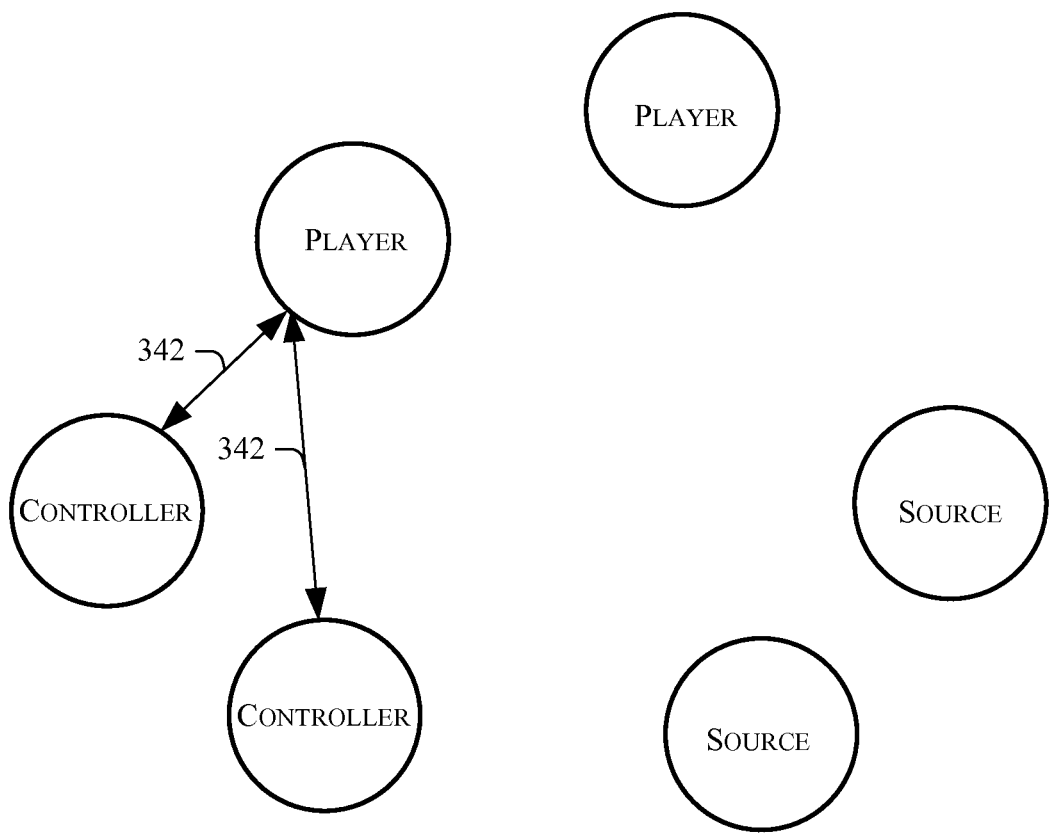
FIG. 4 is a diagram depicting controllers joining a session with a player.

In some instances, only one player is available as a viable player (e.g., one player is connected by Bluetooth to an audio system of a car), and in these instances the single player may initiate a session with other devices. In other instances, there may be two or more devices (e.g., communication devices) that are available to assume the role of a player, and in these instances, when operation of a controller is initiated it may select a player to use for media playback. If a selected player is already engaged in playback operations, the controller will get information about the play queue, information about the currently playing media, and information about the progress of the currently playing media, and the controller displays this information for the user. FIG. 4 shows a controller joining the session 342 with one of the players.

Besides getting the current state of a player, another reason for a controller to join a player before selecting media to play is to query the player for the media formats the player supports. This can be used to filter out media the player does not support when browsing media sources; thus reducing user confusion by preventing unsupported media files from being selected.

Controllers Choosing Media for Playback

Figure 5:
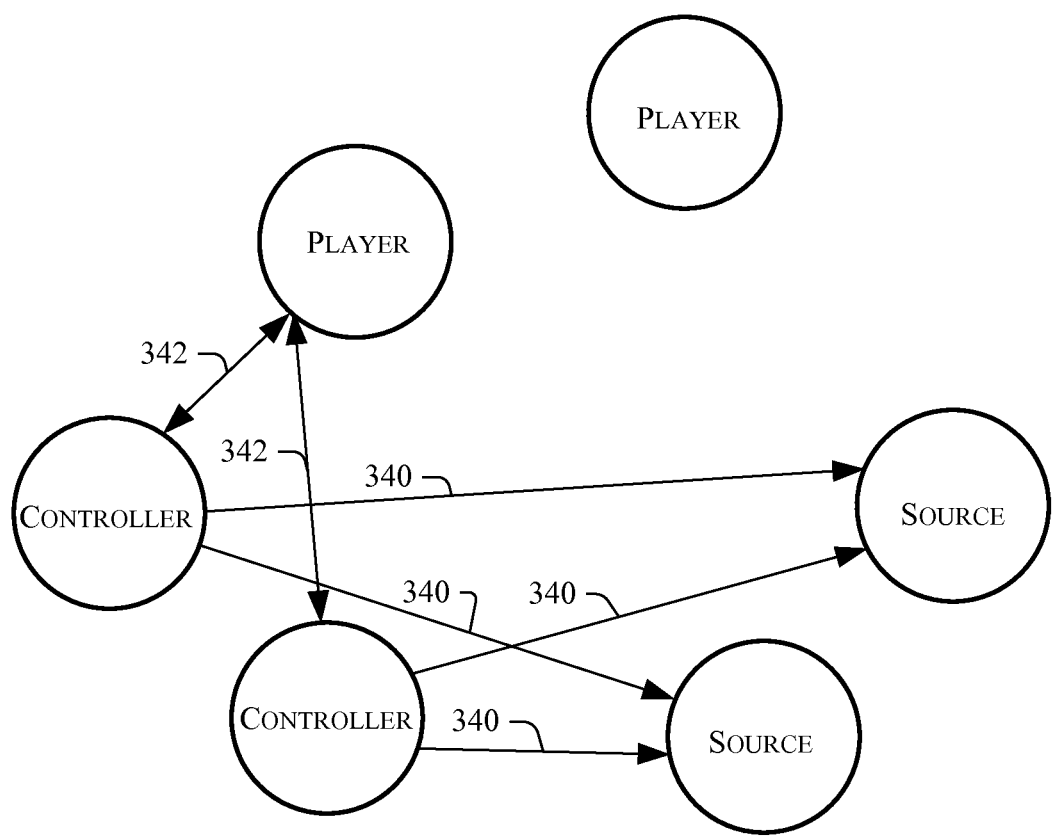
FIG. 5 is a diagram depicting controllers communicating with sources to browse available media content.

Once a controller has joined a player's session, it can discover available media sources. A controller can connect to one or more sources to browse available media, and the user will select media for playback via the controller. The controller will inform the player to add the media selected by the user to the end of the play queue, and the player will inform all other controllers of this change to the play queue. FIG. 5, for example, depicts two controllers independently browsing two sources.

The sessions 340 between the controller and source are not required to persist. Once the user is done browsing available media, the controller may terminate the session 340 with the source. This is particularly useful for battery-powered devices where maintaining unnecessary connections may reduce the battery life.

Player Streaming Media from a Source

Figure 6:
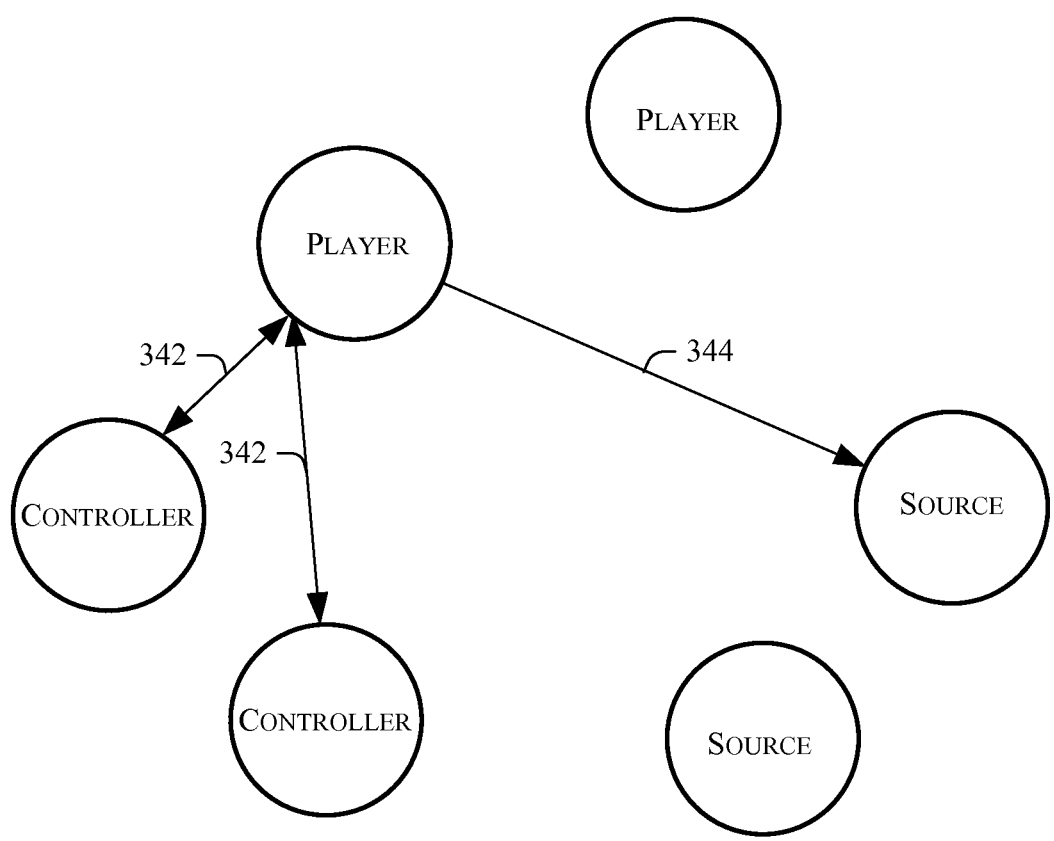
FIG. 6 is a diagram depicting a source streaming content to a player.

When the player starts playback of a specific entry in its play queue, the player will establish a session 344 with the source that contains that specific media. FIG. 6 shows the player connected to one of the sources for streaming the currently playing media. Additionally, the controllers are still connected to the player via the session 342 so they can receive playback progress updates and control the play/pause state as well as tell the player to seek to a new position within the media. As can also be seen in FIG. 6, one of the sources is not actively part of any session since the player is streaming from only one source and neither controller is browsing either of the two sources.

If a controller elects not to control the player nor receive updates to the play queue or progress of the currently playing media, the controller can drop off the session 342 with the player. This will not affect the play queue. The controller may return at any time in the future and it will be updated with the latest playback states upon its return. This will allow a battery-powered controller to drop its connection with the player to reduce its power consumption.

Architecture of Each Role

Figure 7:
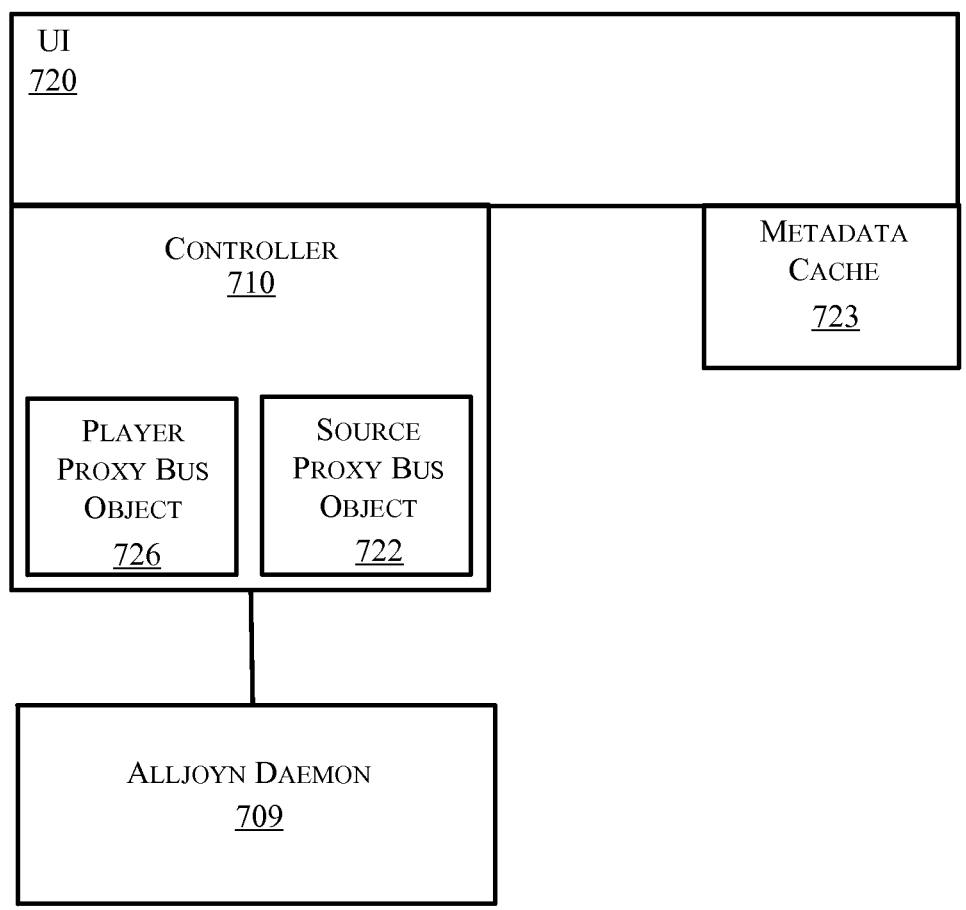
FIG. 7 is a block diagram depicting an exemplary architecture of a controller.
Figure 8:
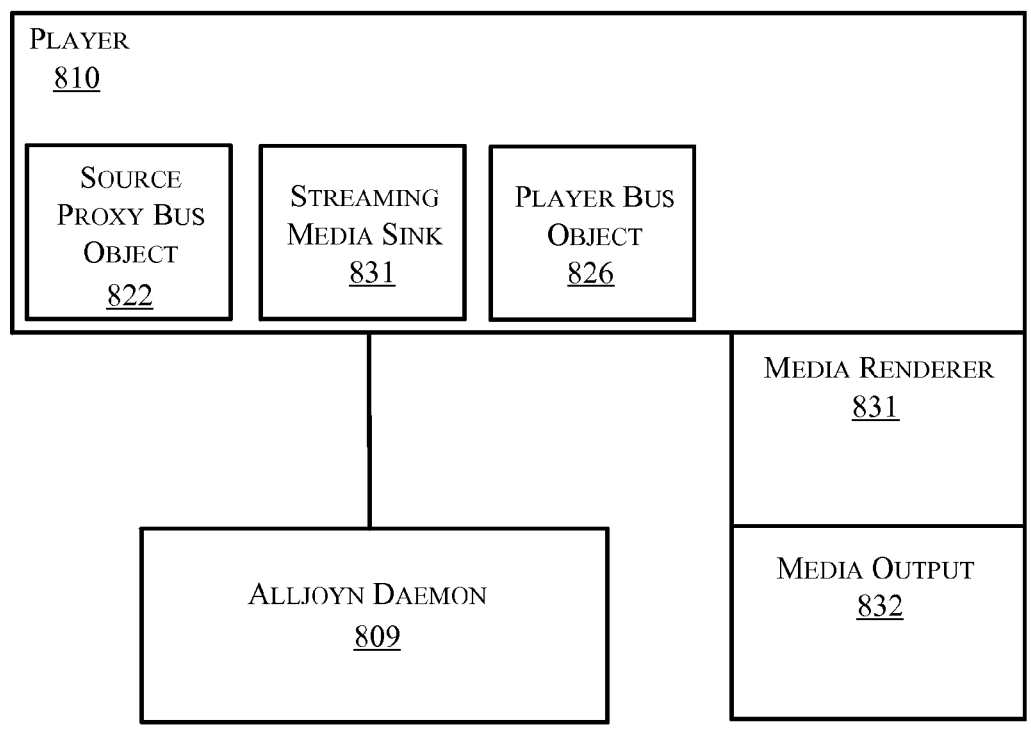
FIG. 8 is a block diagram depicting an exemplary architecture of a player.
Figure 9:
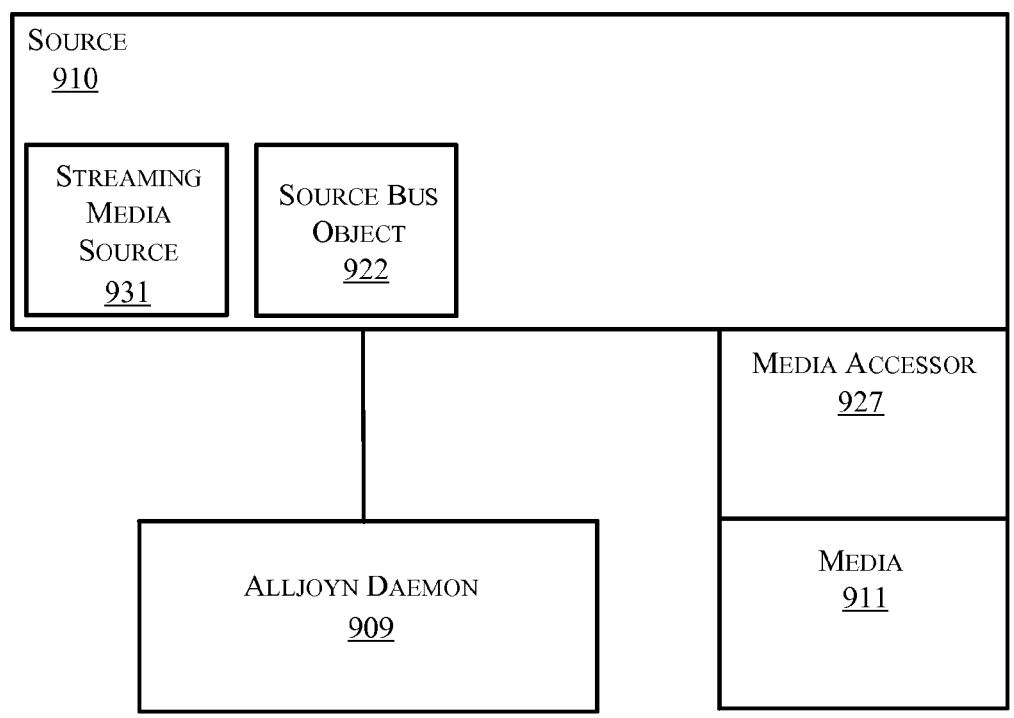
FIG. 9 is a block diagram depicting an exemplary architecture of a source.

Referring to FIGS. 7, 8 and 9, shown are block diagrams depicting exemplary architectures for a controller, a player, and a source, respectively. Although other embodiments may certainly be implemented using variations of, or alternatives to, these architectures, the architectures depicted in FIGS. 7, 8, and 9 are implemented in accordance with peer-to-peer technology that is marketed and distributed under the trade name AllJoyn®. Details of the AllJoyn® technology may be obtained at www.alljoyn.org, which provides several documents including the "AllJoyn Android Environment Setup Guide," among others, which are incorporated herein by reference.

It should be recognized that the architectures of the controller, player, and source are separately depicted for clarity only and that all three roles may be integrated and share constituent components in a single communication device.

Controller

FIG. 7 shows a basic block diagram of an exemplary controller. As shown, the exemplary controller 710 is in communication with an optional user interface 720 and an AllJoyn® daemon 709, which is a specific implementation of the generic peer-to-peer modules 109 described with reference to FIG. 1. In this embodiment, the controller 710 only operates as a client, and as a consequence, the controller component utilizes ProxyBusObjects for accessing player devices and source devices via AllJoyn® technology. Specifically, the controller component 710 includes a player proxy bus 726 that enables a user to interact with a player that resides on another communication device as if the user were operating the player at that other communication device. In addition, the controller includes a source proxy bus object 722 to communicate with source devices to enable the controller to receive metadata that is indicative of the media content that resides on the source devices. Also shown is an optional metadata cache that may be used to cache the received metadata.

Player

Referring to FIG. 8, it shows a basic block diagram of a typical player 810. In this embodiment, the player 810 provides a service that controllers use (e.g., to control playback of media content and add media to a playlist (also referred to herein as a play queue), so the player 810 implements a player BusObject 826 that corresponds to the ProxyBusObject 726 used by the controller 710. The player 810 is also a client of sources so it also uses a source ProxyBusObject 822 for setting up streams with a source. Since the player 810 is a media sink, it implements the AllJoyn® streaming MediaSink 831 functionality as well.

Source

Referring next to FIG. 9, it shows a block diagram of a typical media source 910. The source 910 provides a service to controllers and players, and as such, implements a source BusObject 922. It is also a media source, and as a consequence, it implements the AllJoyn® streaming MediaSource 931 functionality. As shown, the exemplary source 910 includes media storage 911 that is accessed by a media accessor 927.

In operation, the source ProxyBusObject 822 at the controller 810 in connection with the source BusObject 922 enable the controller 810 to engage in a brief session with the source 910 to retrieve media metadata that identifies media content available in the media storage 911. The controller 810 may then leave the session with the source 910 to save power, and the PlayerProxyObject 726 of the controller 810 in connection with the PlayerBusObject 826 enable the controller 710 to add media files to the playlist maintained by the player 810 and control one or more aspects of the play of the media at the player 910 as discussed herein. The StreamingMediaSource 931 in connection with the StreamingMediaSink 831 enable a particular media file to be streamed from the source 910 to the player 810 when the particular media file is at the top of the playlist. And as shown, the media renderer 831 of the player 810 renders the media for presentation at the media output component 832.

Figure 10:
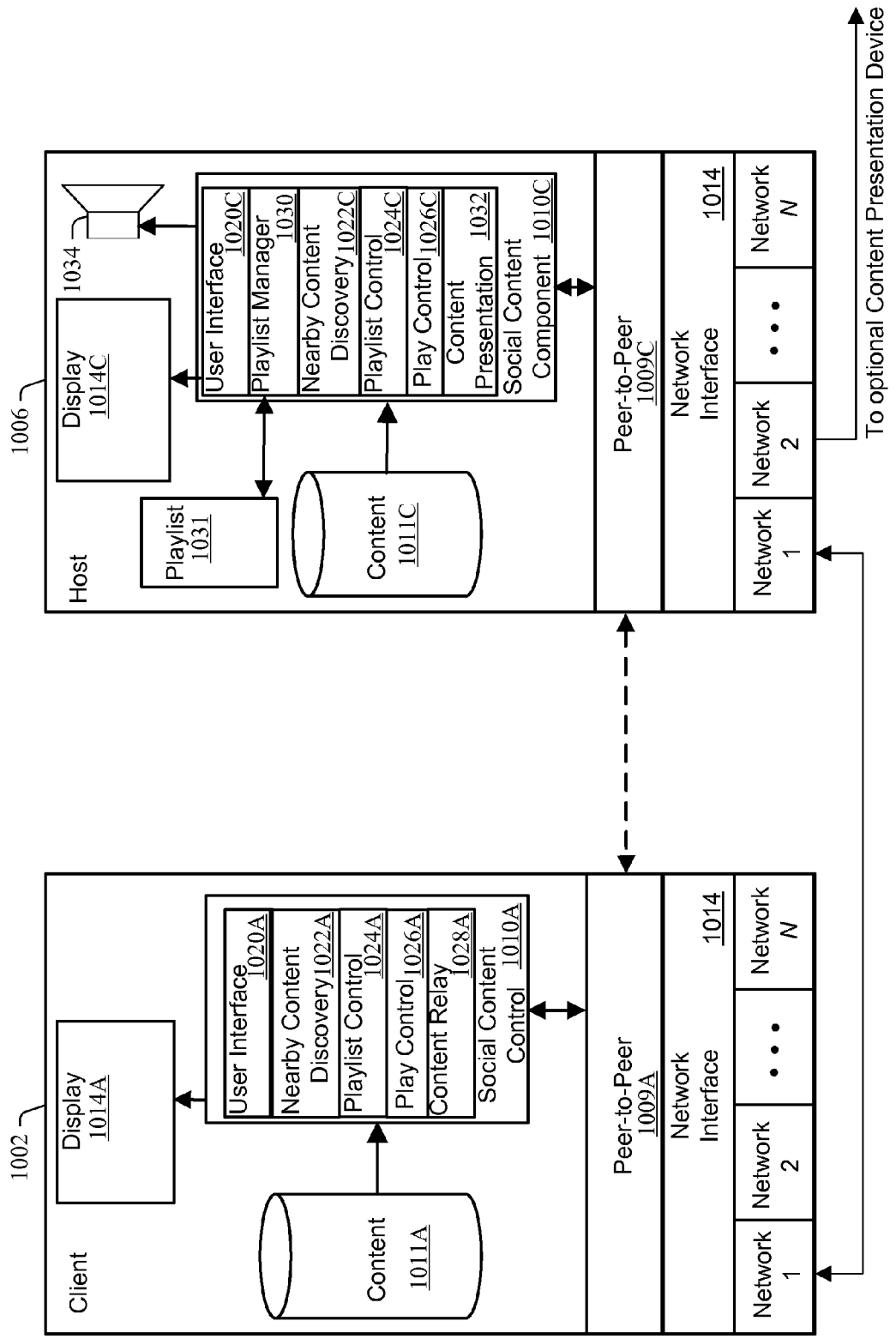
FIG. 10 is a block diagram depicting an exemplary embodiments of communication devices depicted in FIG. 1.

Referring next to FIG. 10, shown are communication devices 1002, 1006 that may be used to realize the communication devices 102, 104, 106 described with reference to FIG. 1. As shown, the communication device 1002 is operating as a client device and the communication device 1006 is operating as a host device, but in many embodiments both the communication devices 1002, 1004 may operate as either client or host communication devices.

As depicted, when operating as a client communication device 1002, a social content control component 1010A of the communication device 1002 includes a user interface 1020A, a nearby content discovery component 1022A, a playlist control component 1024A, a play control component 1026A, and a content relay component 1028A. As shown, the social content control component 1010A is in communication with a peer-to-peer component 1009A, a content storage component 1011A, and a display 1014A. Also depicted is a network interface 1014 that couples the peer-to-peer component 1009A to N network components. In this embodiment, the client communication device 1002 operates both as a source device (to provide media) and as a controller to control the playback of media content at the communication device 1006.

As shown, when operating as a host, the communication device 1006 includes many of the same components as the client communication device 1002, but in addition, the social content component 1010C of the host communication device 1006 includes a playlist manager 1030 to manage a playlist 1031, and a content presentation component 1032 to manage the presentation of content that resides on either the client communication device 1002 or the host communication device 1006. In addition, an audio transducer 1034 is also depicted on the host communication device 1006. In this embodiment, the communication device 1006 operates as a controller, a player, and a source.

The depiction of these components is logical and is not intended to be an actual hardware diagram, and as discussed further herein, each component may be further separated into constituent components, but it should also be recognized that the components may be integrated to such an extent that each component may not be separately recognizable in actual implementation. For example, the depicted division of the social content control components 1010A, 1010C into constituent components is exemplary only to facilitate a description of the functions that the social content control components 1010A, 1010C have in the exemplary embodiment, and in actual implementation, there may be separate hardware, firmware, and/or software components that do not exactly correspond to the functional division described with reference to FIG. 10.

It should also be recognized that the communication devices 1002 and 1004 are merely examples of the types of communication devices that may be utilized in connection with the embodiments described herein, and that other communication devices that have less functionality may be utilized as well. For example, headless communication devices that do not include user interface components 1020 or displays 1014 may function as source and/or player devices.

Figure 11:
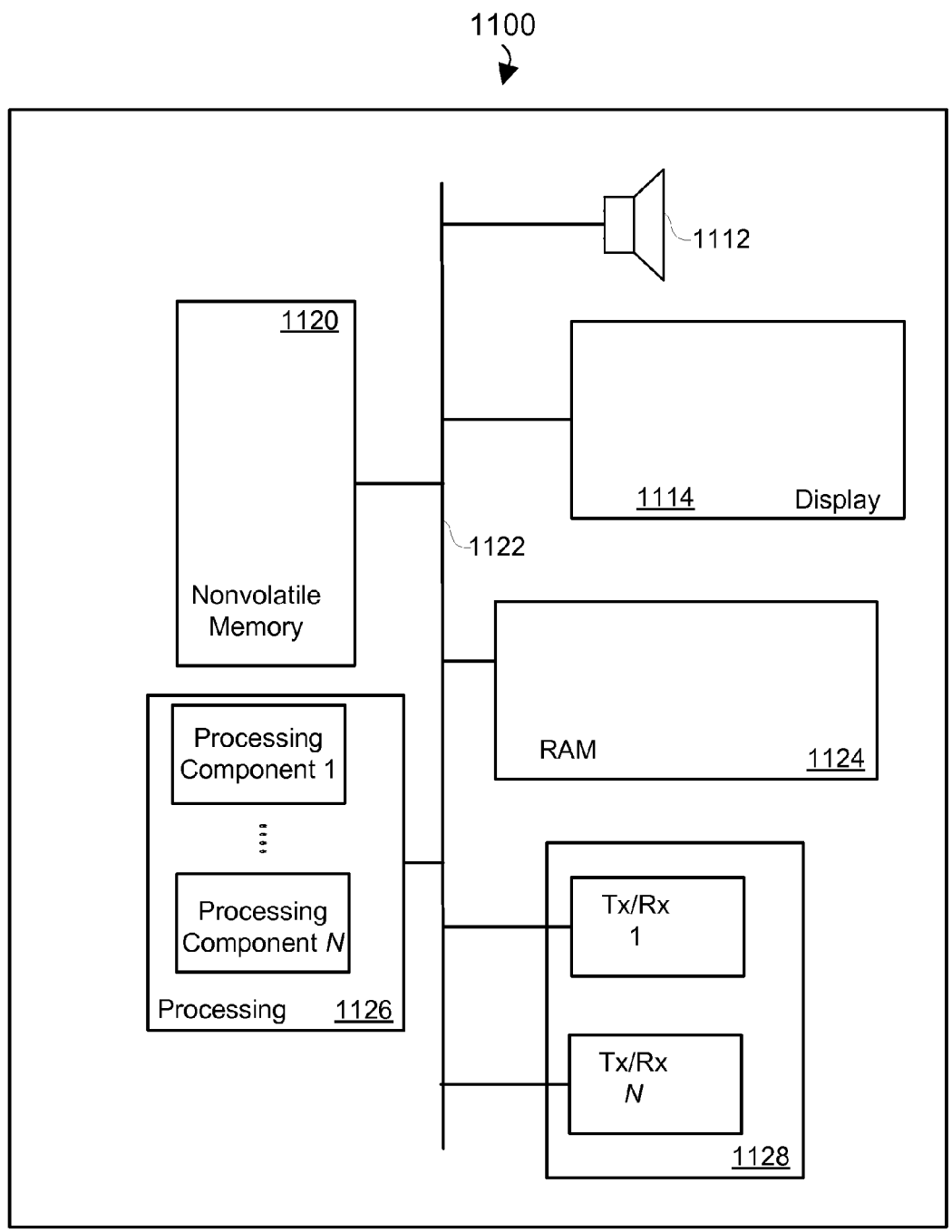
FIG. 11 is a block diagram depicting physical components that may be used to realize the functional components depicted in FIGS. 1 and 2.

Referring briefly to FIG. 11, shown is a block diagram depicting physical components of an exemplary communication device 1100 that may be utilized to realize the communication devices 102, 104, 106 described with reference to FIG. 1 and the communication devices 1002, 1006 described with reference to FIG. 10. As shown, the communication device 1100 in this embodiment includes an audio transducer 1112 (e.g., a speaker), a display 1114, and nonvolatile memory 1120 that are coupled to a bus 1122 that is also coupled to random access memory ("RAM") 1124, a processing portion (which includes N processing components) 1126, and a transceiver component 1128 that includes N transceivers. Although the components depicted in FIG. 11 represent physical components, FIG. 11 is not intended to be a hardware diagram; thus many of the components depicted in FIG. 11 may be realized by common constructs or distributed among additional physical components. Moreover, it is certainly contemplated that other existing and yet-to-be developed physical components and architectures may be utilized to implement the functional components described with reference to FIG. 11.

This display 1114 generally operates to provide a presentation of content to a user, and in several implementations, the display is realized by any of a variety of displays (e.g., LCD or OLED displays). And, in general, the nonvolatile memory 1120 functions to store (e.g., persistently store) data and executable code including code that is associated with the functional components depicted in FIGS. 1 and 10. In some embodiments for example, the nonvolatile memory 1120 includes bootloader code, modem software, operating system code, file system code, and non-transitory processor-executable code to facilitate the implementation of one or more portions of the social content control components 110A, 110B, 110C, 1010A, 1010C discussed in connection with FIGS. 1 and 10 as well as other functional components depicted in FIG. 10. In addition, the playlist 1031 may be stored in RAM 1124 and the content storage 111A, 111B, 111C, 1011A, 1011C may be realized by the nonvolatile memory 1120.

In many implementations, the nonvolatile memory 1120 is realized by flash memory (e.g., NAND or ONENAND™ memory), but it is certainly contemplated that other memory types may be utilized as well. Although it may be possible to execute the code from the nonvolatile memory 1120, the executable code in the nonvolatile memory 1120 is typically loaded into RAM 1124 and executed by one or more of the N processing components in the processing portion 1126.

The N processing components 1126 in connection with RAM 1124 generally operate to execute the instructions stored in nonvolatile memory 1120 to effectuate the functional components depicted in FIGS. 1 and 10. As one of ordinarily skill in the art will appreciate, the processing components 1126 may include a video processor, modem processor, DSP, graphics processing unit (GPU), and other processing components.

The depicted transceiver component 1128 includes N transceiver chains, which may be used for communicating with external devices via wireless or wire line networks. Each of the N transceiver chains may represent a transceiver associated with a particular communication scheme, and these may be utilized in connection with the network interface 1014 to communicate with remote communication devices (e.g., via Bluetooth or WiFi).

Figure 12:
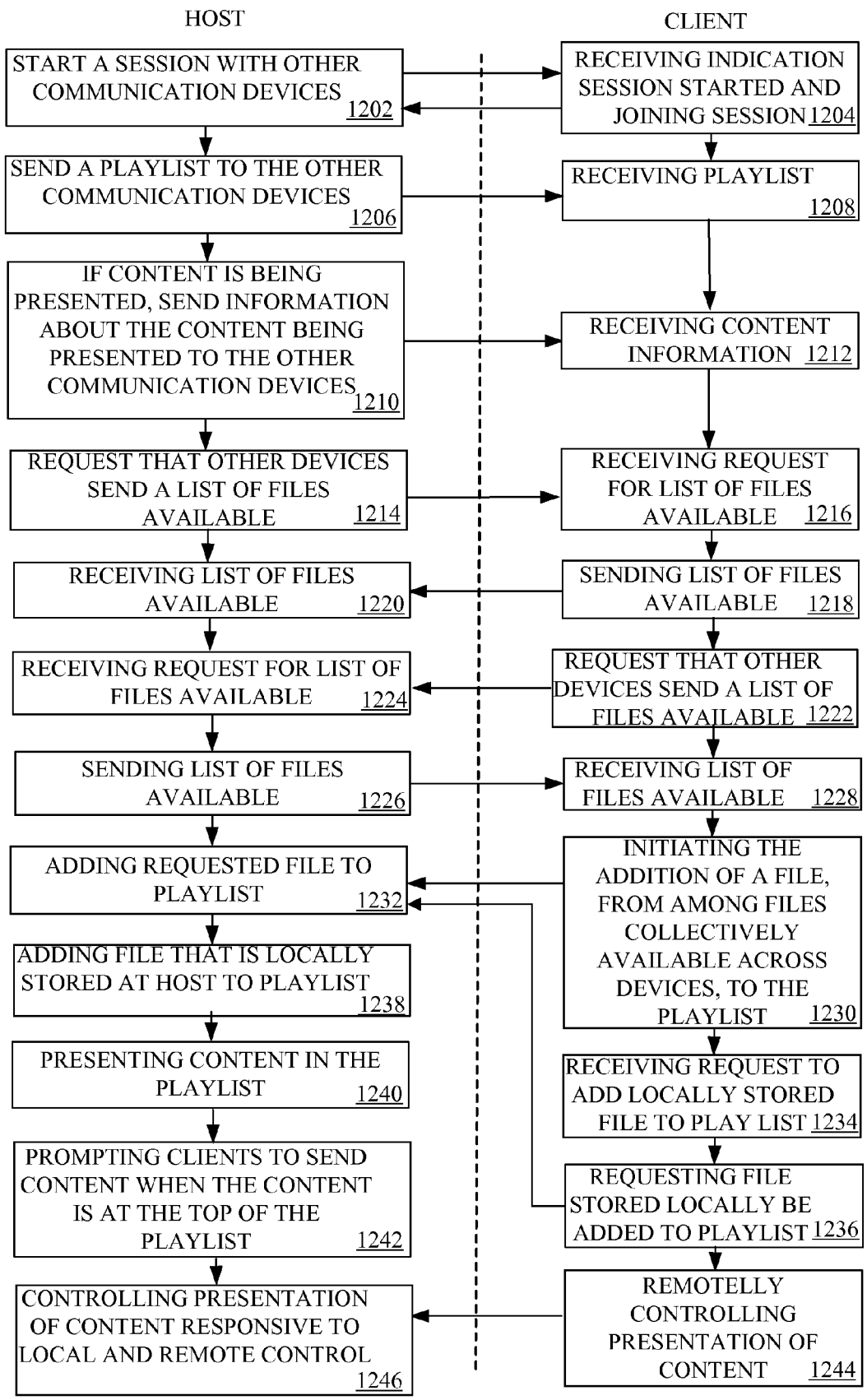
FIG. 12 is a flowchart that depicts a method that may be carried out in connection with the embodiments described with reference to FIGS. 1-10.

Referring to FIGS. 10 and 12, operation of the exemplary embodiments depicted in FIG. 10 is described. Although FIGS. 10 and 12 are described in connection with an exemplary audio-file (e.g., music) use case, it should be recognized that the embodiments described with reference to FIGS. 10 and 12 are certainly applicable to other use cases including the social presentation of images, video content, and other content that may be presented via an audio transducer and/or visual display to a group of people.

As shown, FIG. 10 separately depicts operations that may be traversed by the host communication device 1006 and the client communication device 1002. But as previously discussed, in many implementations each of the communication devices 1002, 1006 may carry out the steps associated with a host or a client communication device depending upon the relative roles that are assumed by each of the communication devices 1002, 1006; thus, each communication device 1002, 1006 may include all the functional components depicted in the two communication devices 1002, 1006, and each communication device 1002, 1006 may implement any combination of a source, controller, and player.

As depicted, in the exemplary mode of operation, the social content component 1010C in connection with the peep-to-peer component 1009C of the host communication device 1006 initially starts a peer-to-peer session that may be joined by other communication devices including the client communication device 1002 (Block 1202), and the peer-to-peer component 1009A of the client communication device 1002 enables the client communication device 1002 to join the session in response to receiving an indication that the session has started (Block 1204).

Although not required, each of the peer-to-peer components 1009A, 1009C in this embodiment may be realized by components that are implemented in manner that is consistent with the architectures described with reference to FIGS. 7, 8, and 9 in accordance with the above-identified peer-to-peer technology that is marketed and distributed under the trade name AllJoyn®. As represented by the dotted line between the mobile communication devices 1002, 1006, once a session is initiated, the social content control components 1010A, 1010C intercommunicate as though the two components 1010A, 1010C were directly connected. The peer-to-peer components 1009A, 1009C provide many other beneficial functions that are detailed in the above-identified document; thus those details are not repeated herein for clarity.

Figure 13:
FIGS. 13-22 are screen shots from a communication device depicting aspects of user-interfaces that may be utilized in connection with an exemplary embodiment.
Figure 14:

Referring to FIG. 13, shown is a screen shot of an exemplary user interface that may be presented (by the user interface components 1020A, 1020C) to the users of the communication devices 1002, 1006 to initiate or join a peer-to-peer session. And FIG. 14 depicts a screen shot of a user interface that enables a user to name the created session.

Figure 15:
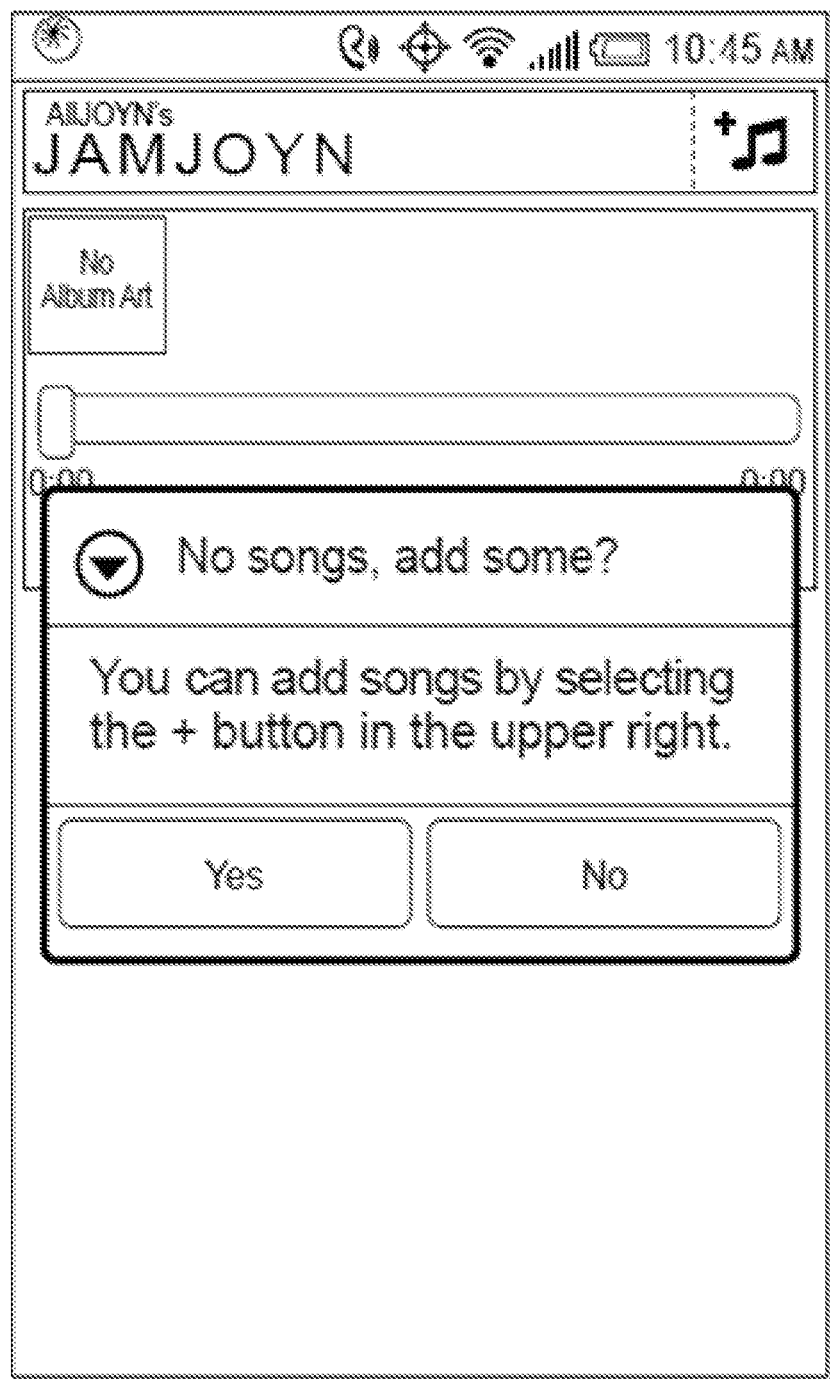
Figure 16:
Figure 17:
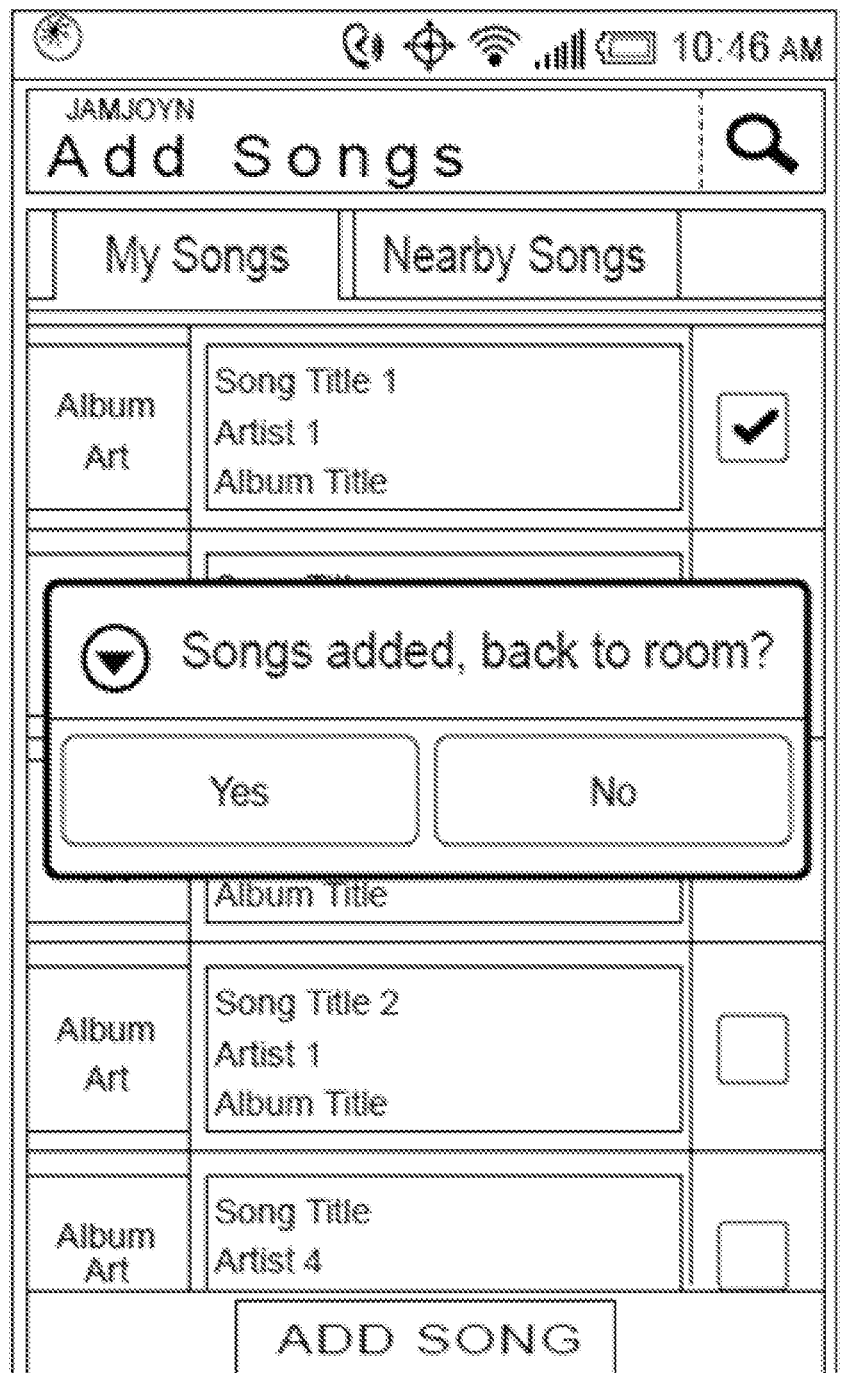

As shown in FIG. 12, once a session has started, the playlist manager 1030 of the host communication device 1006 sends a listing of files in the playlist 1031 (if a playlist has been started at the host 1006) to the other communication devices in the session (Block 1206). If the playlist 1031 has not been initiated, the user interface 1020C in connection with the playlist manager 1030 enable a user of the host communication device 1006 to create and start the playlist 1031. Referring briefly to FIGS. 15-17 for example, shown are screen shots of an exemplary prompts that may be presented to a user to create a music playlist from available content (songs) that are stored in the content storage 1011C.

As depicted in FIG. 12, once the playlist 1031 is created, the other communication devices, including the client communication device 1002, receive the playlist (Block 1208), and the user interface 1020A presents the listing of files in the playlist to a user of the client communication device 1002.

Figure 18:
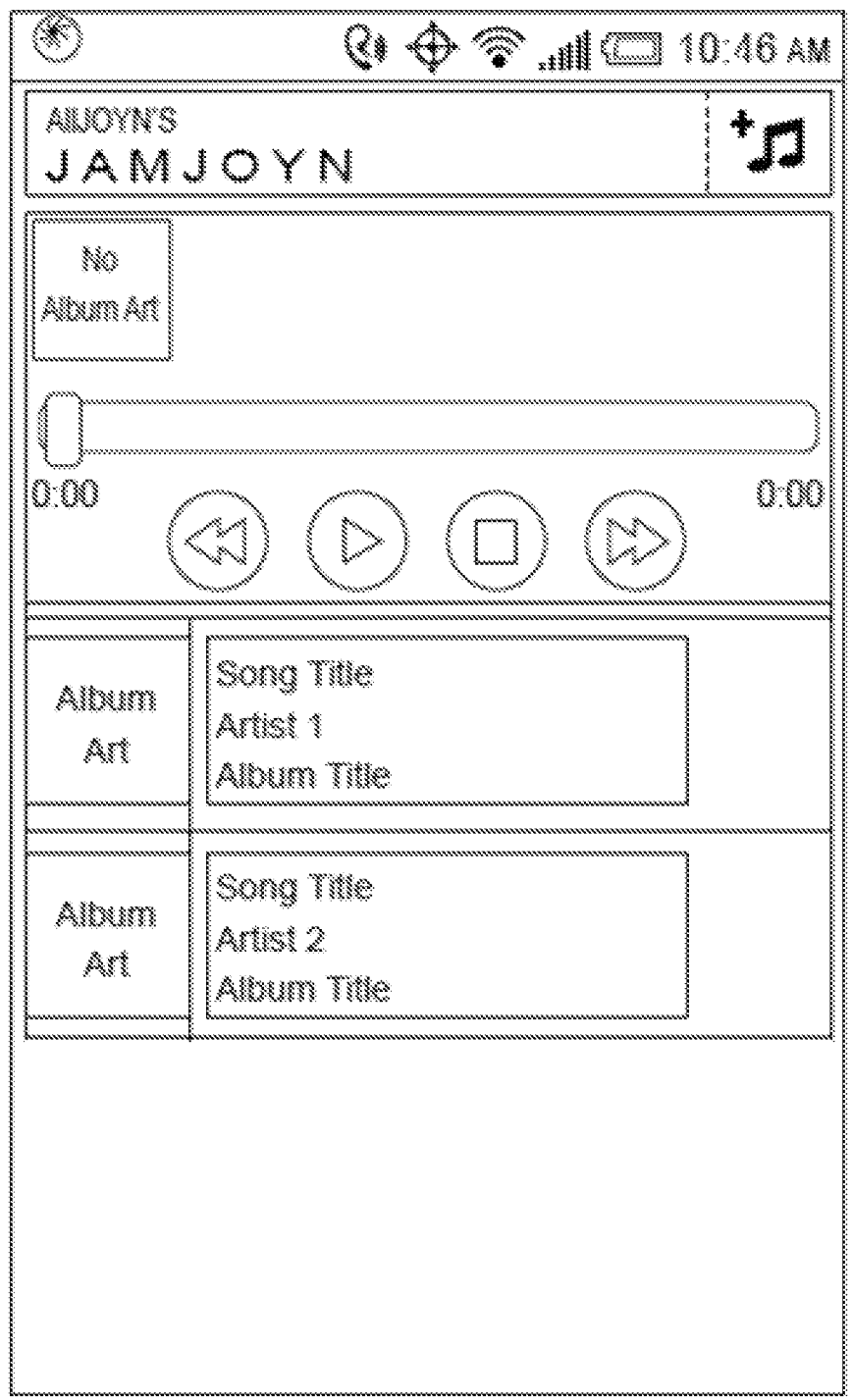

Referring briefly to FIG. 18 for example, shown is a screen shot of an exemplary playlist that may be presented to a user of the client communication device 1002 and other communication devices.

As shown, the user interface depicted in FIG. 18 also includes controls to remotely control, from the client communication device 1002, the presentation of content. Specifically, the user interface includes rewind, play, stop, and fast forward buttons that enable the user of the client communication device 1002 to control the corresponding operations at the host communication device 1006. In addition, the exemplary user interface depicted in FIG. 18 includes a progress bar that depicts the progress of a content file that is currently being played. It should be recognized that the user interface depicted in FIG. 18 is merely exemplary and that other formats may be utilized, and in addition, when content other than music or video is presented, the user interface need not include the depicted controls or the progress bar.

Figure 19:
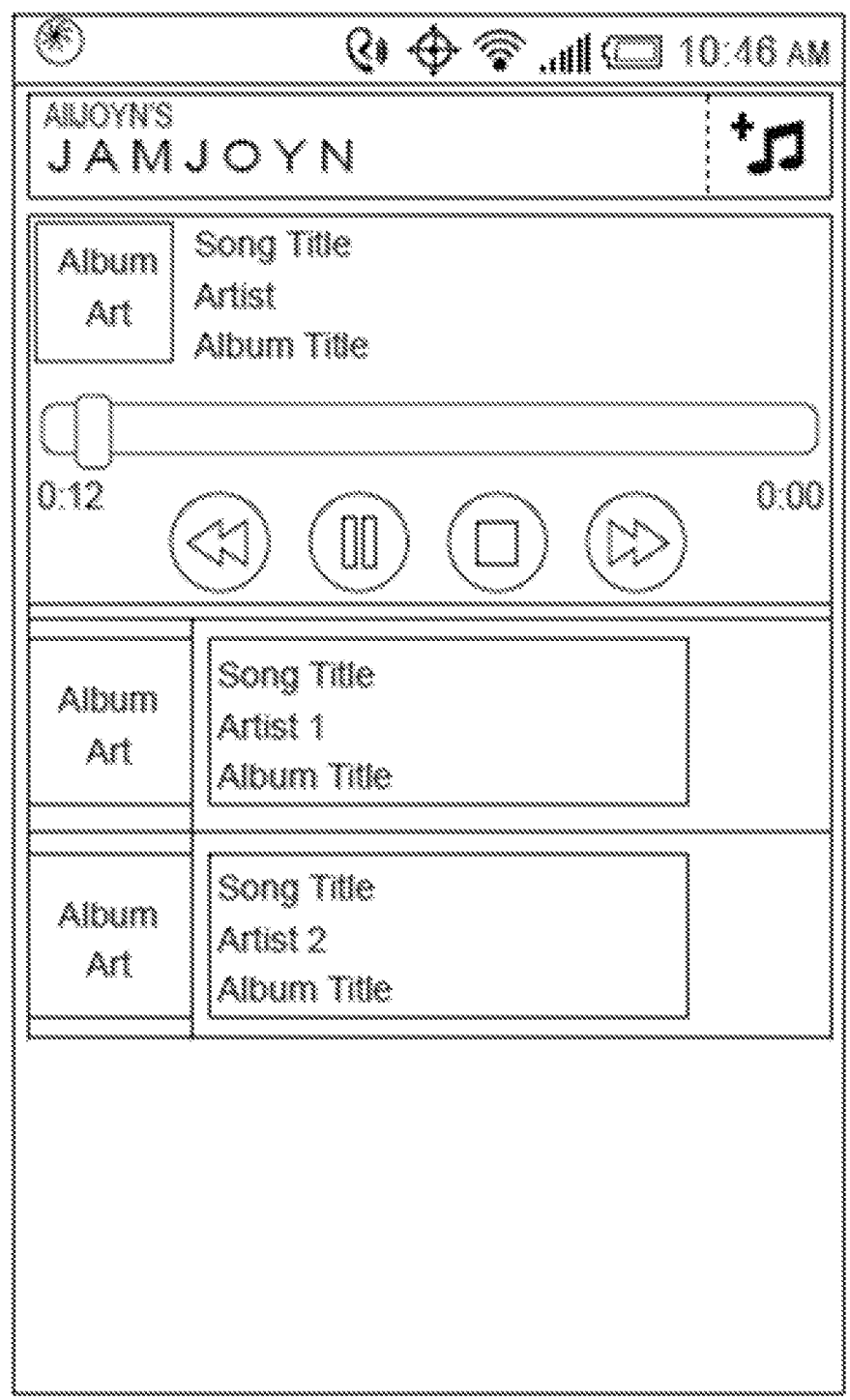

Referring again to FIG. 12, if content is currently being presented by the host communication device 1006 (e.g., on the display 1014 and/or audio transducer 1034 of the host communication device 1006 or at a separate device such as the content presentation component 108), then information about the current presentation of content is sent to the other communication devices (Block 1210), and this information is received at the client communication device 1002 (Block 1212) as well as any other client devices that have joined the session. In the context of a music playlist for example, this information may include an artist name, album title, song title, album art (e.g., image data), song length, and current play-progress (e.g., counter information). Referring briefly to FIG. 19, shown is the user interface in FIG. 18, which has been updated with playing information. As shown, the user interface now includes the artist name, album title, song title, album art (e.g., image data), song length, and the current progress of the song play is indicated with the progress bar.

Referring again to FIG. 12, the nearby content discovery component 1022C of the host communication device 1006 may also request that the other communication devices in the session send a list of files that are available (Block 1214), and when the request is received by the client communication device (Block 1216), the nearby content discovery component 1022A of the client communication device 1002 receives the request and sends a list of files that are available in the content storage 1011A (Block 1218), and the nearby content discovery component 1022C in connection with the user interface 1020C at the host communication device 1006 receives and displays (for a user of the host communication device 1006) a list of available files from each of the client communication devices (Block 1220).

In addition, the nearby content discovery component 1022A of the client communication device 1002 enables a user to request that each of the other communication devices (including the host 1006) send a list of files that they have available (Block 1222), and in response to receiving the request (Block 1224), the nearby content discovery component 1022C of the host 1006 sends a list of files that it has available in the content storage component 1011C (Block 1226), and the nearby content discovery component 1022A in connection with the user interface component 1020A of the client communication device 1002 receives and displays the list from the host communication device 1006 (and lists from other communication devices that are part of the session) (Block 1228).

As depicted in FIG. 12, the playlist control component 1024A in connection with the user interface 1020A of the client communication device 1002 enables a user of the client device 1002 to initiate the addition of any file to the playlist 1031 from among the files that are collectively available across each of the communication devices that are part of the session (including the host communication device 1006, the client communication device 1002, or any other communication device that is part of the session) (Block 1230).

In many implementations for example, the client communication device 1002 sends a request to the host communication device 1006 to add one or more files—that are collectively available across all the communication devices—to the playlist 1031. In alternative implementations, the client communication device 1002 sends a request to the particular communication device where the requested file resides, and that particular communication device then sends the request to the host communication device 1006. And in response to the request, the playlist manager 1030 at host communication device 1006 adds the requested file to the playlist 1031 (Block 1232).

Figure 20:
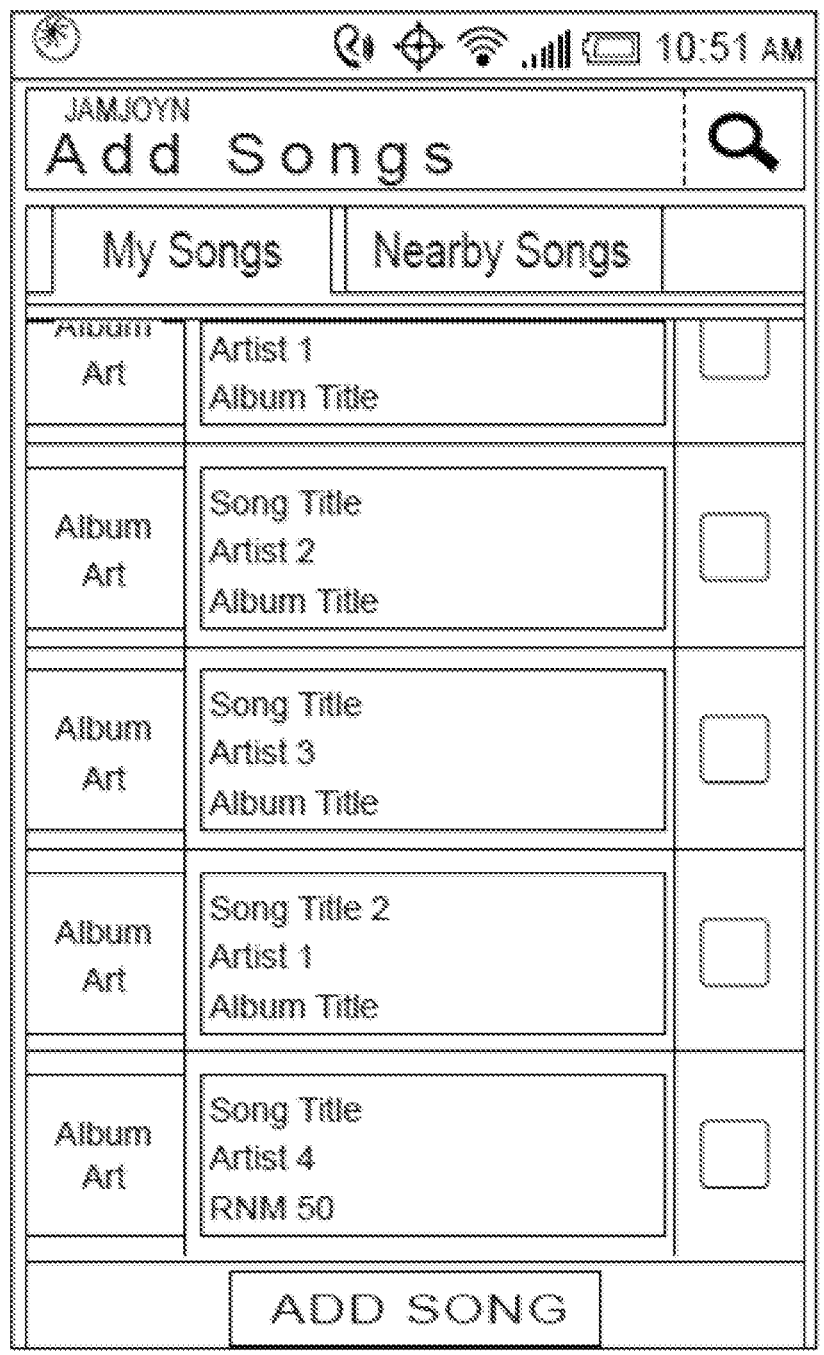

Referring to FIG. 20 for example, shown is a screen shot of a user interface that may be presented to a user that lists files that are available in communication devices that are nearby. When presented with the list of files that are available in nearby devices, the user simply selects the files from the nearby devices that the user would like to add to the playlist 1031.

In addition, the client communication device 1002 may receive requests from other communication devices (including the host communication device 1006) to add files stored locally at the client device 1002 (in the content storage 1011A) to the playlist 1031 (Block 1234). And in response, the playlist control component 1024A of the client communication device 1002 requests that the playlist manager 1030 of the host communication device 1006 add the requested file that is stored at the client communication device 1002 to the playlist 1031 (Block 1236). And as shown, the playlist manager 1030 of the host communication device 1006 then adds the requested file to the playlist 1031 (Block 1232).

A user of the host communication device 1006 may also add a file that is stored at the host communication device 1006 to the playlist (Block 1238). As depicted, the user interface 1020C in connection with the playlist control component 1024C enable a user of the host device 1006 to view and select files in the content storage 1011C to be added to the playlist 1031, and the playlist manager 1030 adds the selected file to the playlist 1031.

As shown, a content presentation component 1032 at the host communication device 1006 functions to present the content in the playlist 1031 to the group of people associated with the session (Block 1240), and when a particular file is at the top of the playlist 1031 (i.e., so it is the file to be played), the host communication device 1006 prompts the communication device where the file resides to send the content to the host communication device 1006 (Block 1242). And the content relay component 1028A at the client communication device 1002 then provides the content to the host communication device 1006. In many embodiments, the content is streamed from the client communication device 1002 to the host communication device 1006, and the host communication device 1006 presents the streaming content as it is received so that files stored at the client devices are not copied at the host communication device 1006.

In many implementations, the host communication device 1006 may present the content via the audio transducer 1034 and/or display 1014C that resides within a housing of the host communication device 1006, or it may send (e.g., stream) the content to a content presentation device such as a remote audio system and/or a remote display. In this latter implementation, the content presentation component 1032 of the host communication device 1006 may operate merely to relay the streaming content received from client devices to a separate device (e.g., to the content presentation component 108).

For example, the host communication device 1006 may receive streaming audio content from other client devices via a first network transceiver (e.g., WiFi transceiver) (in connection with the network interface 1014 and the peer-to-peer component 1009C), and the content presentation component 1032, in connection with the network interface 1014 and a second network transceiver (e.g., a Bluetooth transceiver) facilitates a pass-through of the streaming audio content to a Bluetooth-enabled audio system. In this way, a group of people may add music files to a playlist that is played for the group as a whole in much the same was as people may select music at a typical jukebox. But in the embodiments described herein, the collection of music files is distributed across two or more communication devices.

Referring again to FIG. 12, in many embodiments, the play control component 1026A of the client communication device 1002 may remotely control the presentation of content (Block 1244), and the host communication device 1006 controls the presentation of the content responsive to either local control (via the play control component 1026C) at the host communication device 1006 or responsive to remote control by one or more of the other client communication devices (Block 1246). Beneficially, the peer-to-peer components 1009A, 1009C enable the client device 1002 to control selected operations at the host communication device 1006 as though the operations were being carried out at the client communication device 1002. Details of this type of peer-to-peer control technology are known to those of skill in the art and are available at the above-identified Alljoyn.org website and the associated incorporated-by-reference documents. As a consequence, additional details of the peer-to-peer control are not provided herein.

Figure 21:
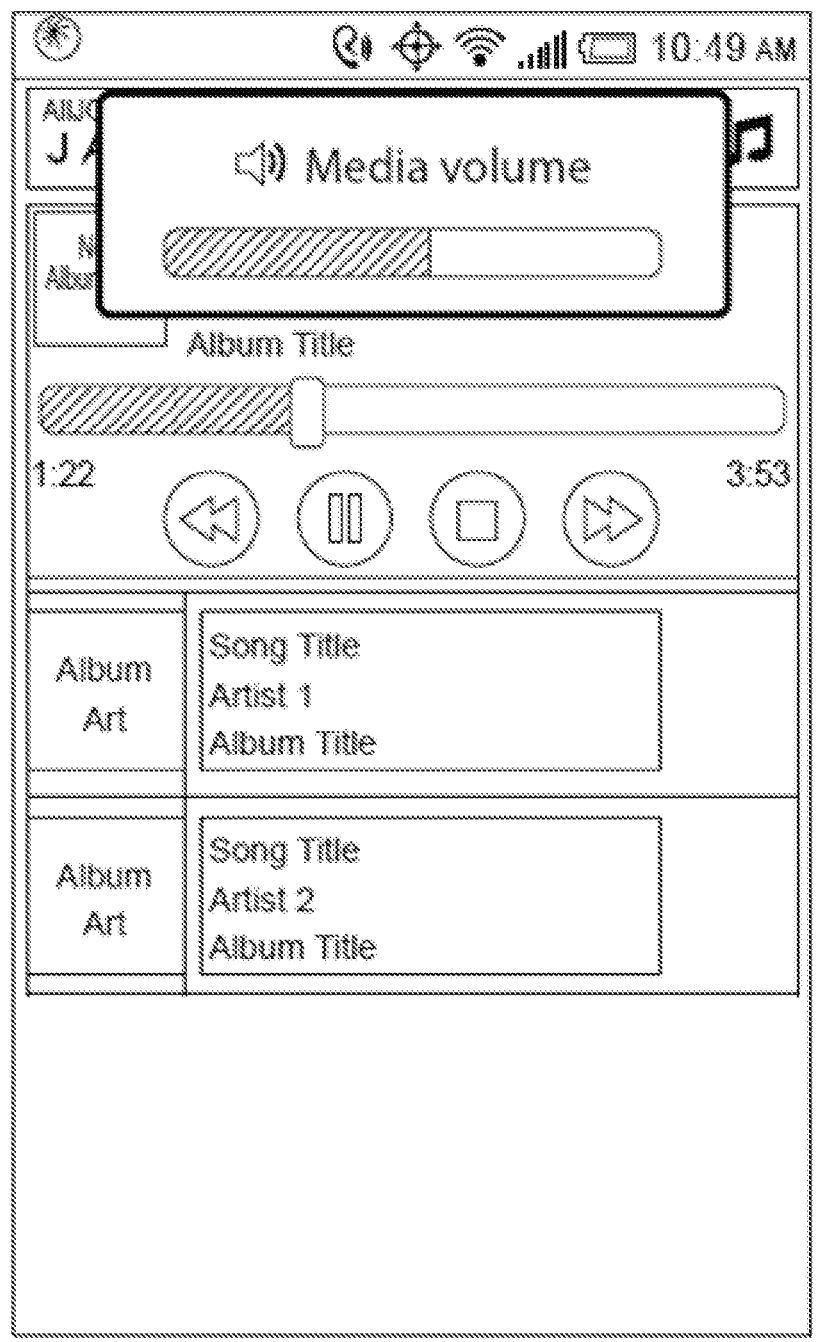
Figure 22:
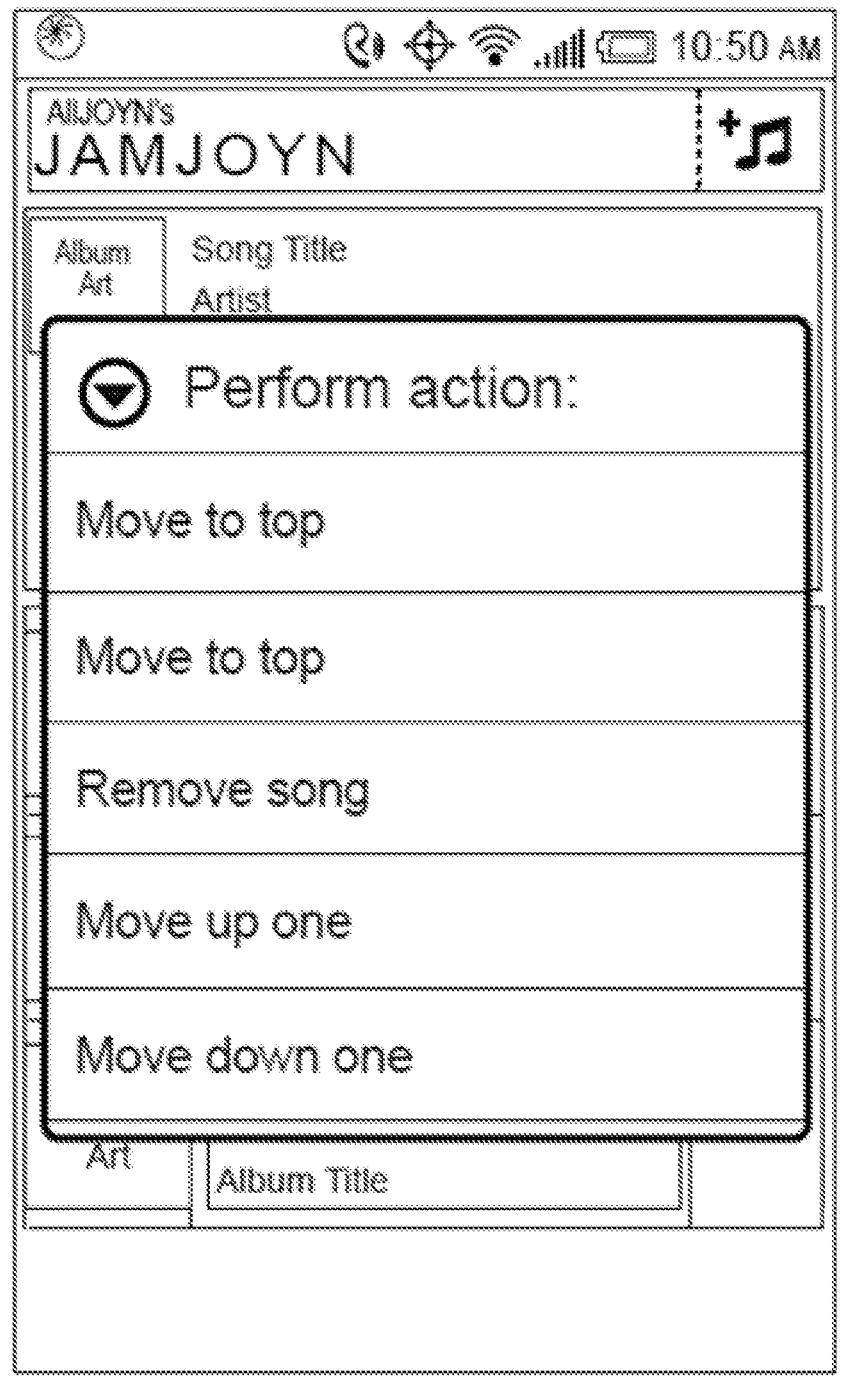

Referring again to the exemplary use-case in which a group of people is joined in a session during which music files are selected and streamed to the host communication device 1006 for play in a jukebox-like manner, in some embodiments, each of the people in the group may stop, start, fast forward, rewind, control the volume of the music, and an order of files in the playlist. Referring for example to FIGS. 19, 21, and 22 for example, shown are screen shots of user interfaces that may be presented by the user interface component 1020A at the client communication device 1002 to control play of music, volume of the music, and an order of the files in the playlist 1031. These user-interfaces may be the very same user interfaces provided by the user interface component 1020C at the host communication device 1006. As a consequence, although not required, in many embodiments each person in the session may control the play of content in the same manner as every other person in the group.

In conclusion, embodiments disclosed herein enable each person in a group of people to select and play content that is distributed among a plurality of communication devices. And in many variations, each of the people in the group may control how the content is played. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A system for playing media content with communication devices that include wireless source devices, wireless player devices, and wireless controller devices, the system comprising:
   a plurality of separate wireless source devices each storing media content, each of the separate wireless source devices providing a media service to enable communication devices that are remote from the wireless source devices to identify and retrieve the media content;
   at least one wireless player device that maintains a single play queue of media content that is distributed across the plurality of separate wireless source devices and plays the media content identified in the playing queue, the at least one wireless player device including an audio transducer, and the at least one player device providing a control service to enable communication devices that are remote from the wireless player device to select the media content in the single play queue, adjust a volume of audio output by the audio transducer, and to remotely control play of the media content at the wireless player device; and
   a plurality of separate wireless controller devices that each select, from among available media content that is distributed across the plurality of separate wireless source devices, media content for the single playing queue, each of the separate controller devices remotely control the volume of audio at the player device and play, at the wireless player device, the media content that is stored at the plurality of separate wireless source devices; and
   each of the wireless source devices, wireless controller devices, and the wireless player device include a peer-to-peer daemon, the peer-to-peer daemons collectively extend a logical bus between the wireless source devices, the wireless controller devices, and the wireless player device, and wherein each of the plurality of separate wireless controller devices is capable of joining and leaving a peer-to-peer session with the at least one player device at will.

2. The system of claim 1, wherein the plurality of separate wireless controller devices directly access the plurality of separate source devices to obtain metadata that indicates the media content that is available on each of the wireless source devices.

3. The system of claim 2, wherein each of the plurality of separate wireless controller devices directly accesses the plurality of separate wireless source devices to obtain the metadata during an ephemeral session that ceases to exist after the metadata is obtained.

4. The system of claim 3, wherein at least one of the separate wireless controller devices maintains a persistent session with the at least one wireless player device to receive playback information from the wireless player device that is selected from among an identification of particular media playing on the at least one wireless player device, an indicator of progress of play of media on the wireless player device, and an audio indicator level.

5. The system of claim 1, wherein each of the plurality of separate wireless controller devices selects a wireless player device that plays the media content.

6. The system of claim 5, wherein each of the plurality of separate wireless controller devices is capable of selecting a player device based upon the media file types that the at least one player device supports.

7. The system of claim 6, wherein each of the plurality of separate wireless controller devices identifies media file types that the at least one wireless player device supports and filters the media content so unsupported media file types are not selectable for play.

8. The system of claim 1, wherein the media service enables the at least one wireless player device to stream a particular media file, from a corresponding one of the plurality of separate wireless source devices where the particular media file resides, when the particular media file is identified at a top of the single queue.

9. The system of claim 1, where in a single communication device is capable of operating as a controller device, a source device, and a player device during a single session with other communication devices.

10. The system of claim 1, wherein the single communication device is a communication device selected from among a smart phone, a tablet, a netbook, a gaming device, and a laptop.

11. A method for playing media content that is distributed across multiple source devices, the method comprising:
   providing a control service at a player device to enable communicatively coupled controller devices to control playback of media on the player device;
   providing a media service at each of the source devices to enable the controller devices to identify and select media content on the source devices and to enable the player device to retrieve the media content from the source devices;
   creating a single play queue at the player device that includes identifiers of the media content selected by the controller devices;
   receiving a stream of particular media content from one of the multiple source devices when the particular media content is identified at a top of the single play queue;
   rendering the particular media content at the player device; and
   presenting the rendered media content to users associated with the controller devices.

12. The method of claim 11, including:
   receiving requests from the controller devices to identify media file types that are supported by the player device; and
   sending a list of supported media file types to the controller devices.

13. The method of claim 11, wherein the control service updates controller devices with playback information.

14. The method of claim 13 wherein the control service enables the controller devices to drop off a session with the player device without affecting the play queue and enables the controller devices to return to the play queue and be updated with the playback information.

15. The method of claim 11, wherein presenting includes feeding the rendered content to a presentation device selected from among an audio amplifier and a display device.

16. The method of claim 11, wherein the control service enables the controller devices to send control commands including commands selected from among rewind, fast forward, pause, stop, and sound level commands.

17. The method of claim 11 including receiving media content metadata from the multiple source devices.

18. The method of claim 11, wherein the player device, the controller devices, and the source devices communicate by a peer-to-peer session established via a short-range communication link that is selected from among Bluetooth, WiFi, Zigbee, and WiFi direct communication schemes.

19. The method of claim 11, wherein the media content is a content type selected from among audio content, video content, and still images.

20. A non-transitory, tangible computer readable storage medium, encoded with processor readable instructions to perform a method for playing media content that is distributed across multiple source devices, the method comprising:
   providing a control service at a player device to enable communicatively coupled controller devices to control playback of media on the player device;
   providing a media service at each of the source devices to enable the controller devices to identify and select media content on the source devices and to enable the player device to retrieve the media content from the source devices;
   creating a single play queue at the player device that includes identifiers of the media content selected by the controller devices;
   receiving a stream of particular media content from one of the multiple source devices when the particular media content is identified at a top of the single play queue;
   rendering the particular media content at the player device; and
   presenting the rendered media content to users associated with the controller devices.

21. The non-transitory, tangible computer readable storage medium of claim 20, the method including:
   receiving requests from the controller devices to identify media file types that are supported by the player device; and
   sending a list of supported media file types to the controller devices.

22. The non-transitory, tangible computer readable storage medium of claim 20, wherein the control service updates controller devices with playback information.

23. The non-transitory, tangible computer readable storage medium of claim 22 wherein the control service enables the controller devices to drop off a session with the player device without affecting the play queue and enables the controller devices to return to the play queue and be updated with the playback information.

24. The non-transitory, tangible computer readable storage medium of claim 20, wherein presenting includes feeding the rendered content to a presentation device selected from among an audio amplifier and a display device.

25. The non-transitory, tangible computer readable storage medium of claim 20, wherein the control service enables the controller devices to send control commands include commands selected from among rewind, fast forward, pause, stop, and sound level commands.

26. The non-transitory, tangible computer readable storage medium of claim 20 including receiving media content metadata from the multiple source devices.

27. The non-transitory, tangible computer readable storage medium of claim 20, wherein the player device, the controller devices, and the source devices communicate by a peer-to-peer session established via a short-range communication link that is selected from among Bluetooth, WiFi, Zigbee, and WiFi direct communication schemes.

28. The non-transitory, tangible computer readable storage medium of claim 20, wherein the media content is a content type selected from among audio content, video content, and still images.

* * * * *